Nov. 21, 1950 A. N. BRUNSON 2,531,252
SURVEYING INSTRUMENT
Filed July 24, 1947 2 Sheets-Sheet 1

Inventor
Amber N. Brunson
By Fishburn & Mullendore
Attorneys

Inventor
Amber N. Brunson.
By Fishburn & Mullendore
Attorneys

Patented Nov. 21, 1950

2,531,252

UNITED STATES PATENT OFFICE 2,531,252

SURVEYING INSTRUMENT

Amber N. Brunson, Independence, Mo.

Application July 24, 1947, Serial No. 763,303

5 Claims. (Cl. 33—46)

This invention relates to improvements in surveying instruments and more particularly to bearings and mountings for telescopes and the like such as are used in transits and the like.

Portable instruments such as transits are subject to rough usage, dust, and inclement weather, yet must be capable of maintaining accurate adjustment at all times whereby highly precision measurements may be obtained. Trunnion axis bearings for portable instruments must be constructed so that the bearing on one standard can be adjusted in a vertical direction to render the axis of the trunnion perpendicular to the vertical axis of the instrument. The bearings must be lubricated and protected from dirt and must rotate about a mathematical axis without any looseness or false motion which introduce serious errors. Attempts have been made to construct telescope trunnion axis bearings that will provide these requirements and not allow play and/or rolling of the trunnion or other introduction of errors in measurements being made. Split bearings of various types capable of adjustment to take up wear have been used but such adjustments are difficult and can be made satisfactorily only by highly skilled instrument mechanics. Therefore, such bearings have not been capable of achieving the long lasting accuracy desirable in such instruments.

The objects of the present invention are to provide a mounting for the telescope of a surveying instrument whereby greater accuracy is secured; to provide a novel mounting for the telescope trunnions of a surveying instrument; to provide a telescope mounting that eliminates possibility of looseness or false movements and is not affected by expansion and contraction, remaining accurate and permitting free turning at all temperatures; to provide a sealed, dust-proof, lubricated, antifriction bearing mounting for the telescope trunnion, assuring accuracy for a long period of use with substantially no adjustments or attention; to provide a control of the free movement of the telescope trunnions without alteration of the bearing mounting or adjustment; to provide a positive clamp for applying friction of the trunnions for selectively preventing rotation thereof in the bearings; to provide vertical adjustment of the trunnion axis; and to provide in structure of this character a sturdy, efficient precision instrument having free movement, maximum accuracy for long periods with no attention, and capable of withstanding abuse in field use under all conditions.

In accomplishing these and other objects of the present invention, I have provided improved details of structure, the preferred form of which is illustrated in the accompanying drawings, wherein.

Figure 1:
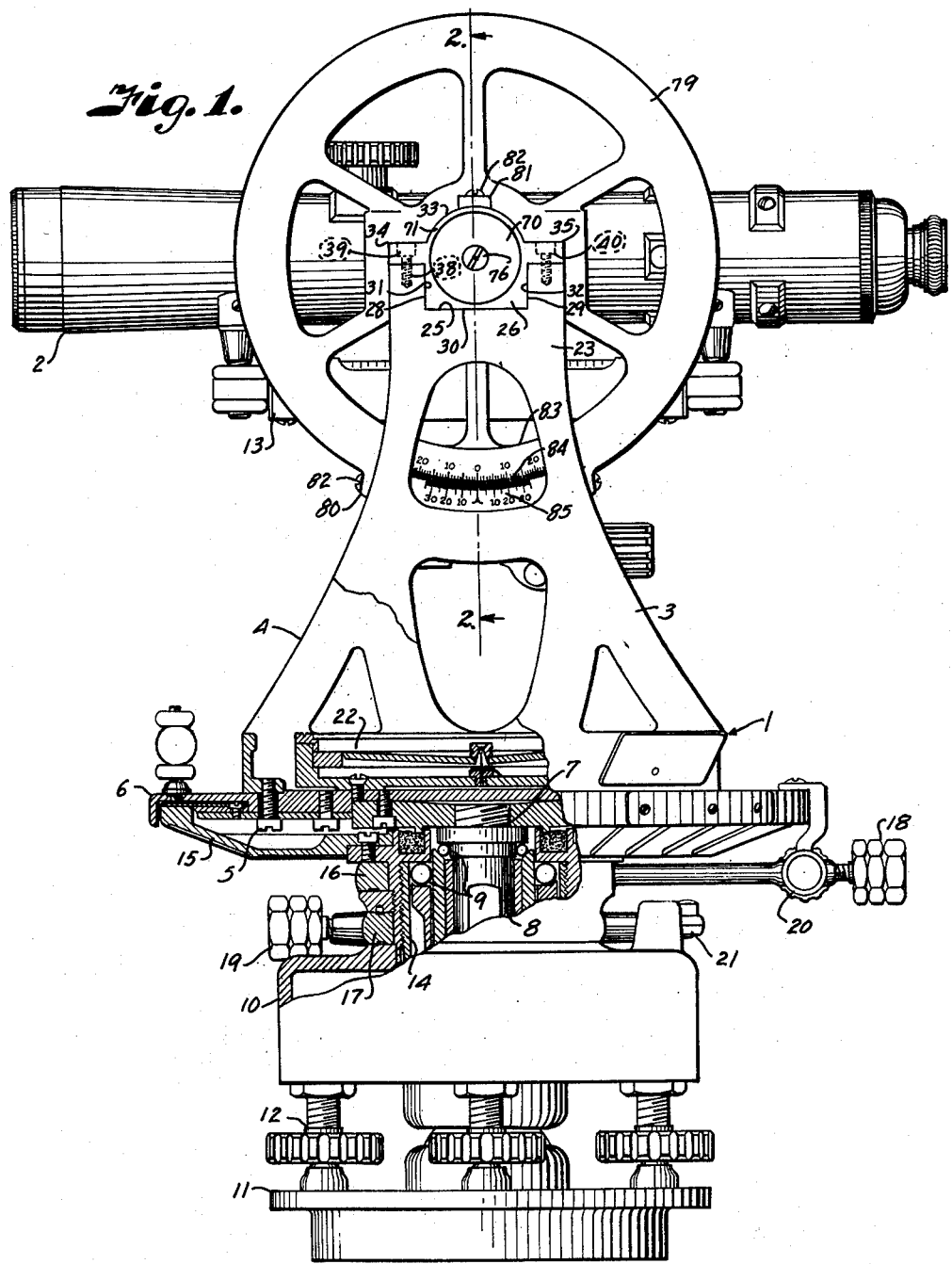
Fig. 1 is a side elevation of a surveying instrument embodying the features of my invention, portions being broken away to illustrate the mounting of the standards on the base.
Figure 2:
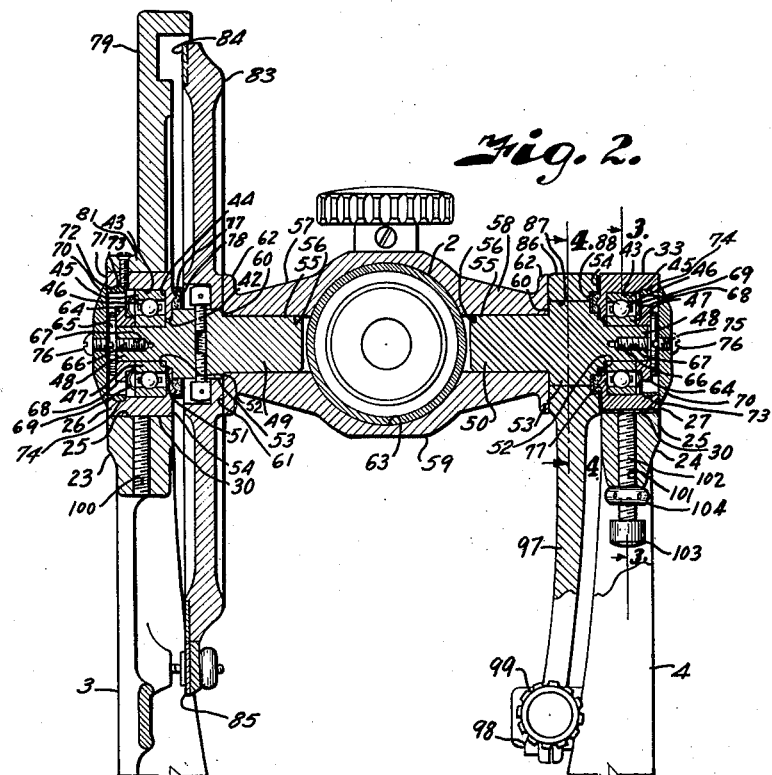
Fig. 2 is a vertical sectional view through the telescope trunnion mountings taken on the line 2—2, Fig. 1.
Figure 3:
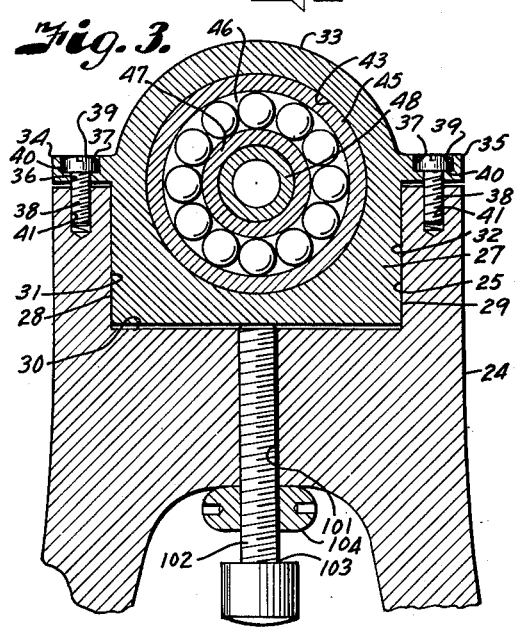
Fig. 3 is a vertical sectional view through the bearing mounting taken on the line 3—3, Fig. 2.
Figure 4:
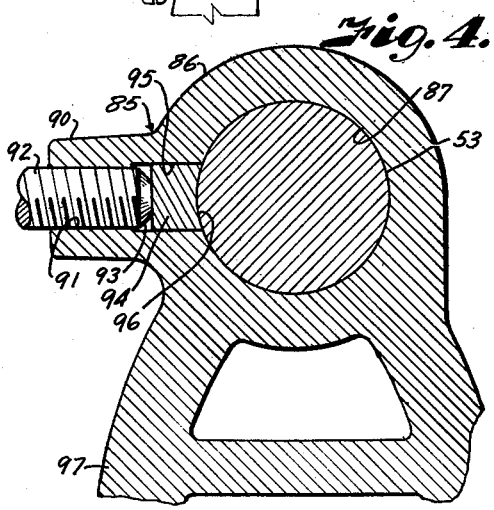
Fig. 4 is a vertical sectional view through the trunnion clamp mechanism taken on the line 4—4, Fig. 2.

Referring more in detail to the drawings:

1 designates a surveying instrument such as a transit or the like which includes a telescope 2, carried by standards 3 and 4 rigidly mounted as by screws 5 on an upper plate 6 which is secured, as at 7, to the upper end of a spindle 8 rotatably mounted on antifriction or other suitable bearings 9 in a leveling head 10. The leveling head 10 is supported on a foot plate 11 by a plurality of leveling screws 12 for adjusting the position of the leveling head and instrument for all horizontal positions of the telescope, as indicated by the spirit level 13 suitably mounted on the instrument as on the lower side of the telescope as illustrated in Fig. 1. Rotatably mounted in the leveling head 10 is a sleeve 14 carrying a lower plate 15, clamping rings 16 and 17 being provided for controlling rotation of the instrument about the vertical axis, said clamping rings being provided with clamp screw assemblies 18 and 19, and slow motion assemblies 20 and 21. Mounted on the upper plate between the standards and coaxial with the spindle 8 is a compass 22.

The standards 3 and 4 extend upwardly from the upper plate 6 and terminate at their upper ends in bearing supporting heads 23 and 24, said bearing heads preferably being of similar structure. The heads 23 and 24 contain rectangular openings 25 having an open top adapted to receive bearing blocks 26 and 27 in the standards 3 and 4 respectively. The lower ends of the bearing blocks are preferably rectangular in shape, having side faces 28 and 29, and a flat bottom face 30, the faces 28 and 29 being spaced to provide a snug engagement thereof with the side faces 31 and 32 of the openings 25 to prevent any lateral play between the blocks and head. The upper portion of the bearing blocks is preferably of semicylindrical shape, as at 33, and projecting outwardly from the blocks, preferably above the axis thereof, are ears 34 and 35 extending beyond the sides of the openings 25 and having apertures 36 provided with a counterbore 37 for receiving the shank 38 and head 39 of preferably roundheaded cap screws 40, the threaded shank of the cap screws being adapted to be threaded into a threaded bore 41 in the bearing supporting head to draw the bearing blocks downwardly on said head, the heads 39 preferably being a close fit in the counterbores 37 for assisting in retaining the bearing blocks against any undesirable movement.

The bearing blocks 26 and 27 are preferably of substantially the same length as the heads 23 and 24, and are provided with bores 42 and counterbores 43 to provide a shoulder 44 adjacent the inner ends of the bearing blocks. The bores 43 are of suitable size to receive the outer race 45 of antifriction bearings 46, said bearings being pressed into engagement with the shoulder 44. The inner races 47 of said antifriction bearings are adapted to receive spindles 48 of trunnion members 49 and 50, said trunnion members having an enlarged portion 51 forming a shoulder with the spindle 48 for engagement with the inner race 47 of the antifriction bearings, said enlarged portion 51 extending through the bore 42 of the bearing blocks and having slight clearance therein. The trunnions 49 and 50 are also provided with an enlarged portion 53 forming a shoulder adapted to substantially engage the inner face 54 of the bearing blocks. The inner ends of the trunnion members 49 and 50 are preferably provided with shanks 55 adapted to extend into bores 56 of bosses 57 and 58 of a telescope mounting member 59, said trunnion members 49 and 50 being provided with shoulders 60 spaced from the shoulders 54 and adapted to be engaged by outer faces 61 of flanges 62 on the trunnion mounting member 59, said trunnion mounting member being provided with a bore 63 perpendicular to the axis of the trunnions 49 and 50 for receiving the telescope 2 which is rigidly secured therein.

Collars 64 are sleeved on the spindles 48 and engaged by heads 65 of screws having shanks 66 threadedly engaged in threaded bores 67 of said spindles, said screws applying pressure to the collar longitudinally of the spindles to retain the inner race of the bearings on the spindles and in engagement with the shoulders 52. The collars 64 are also provided with a flange 68 for retaining a resilient seal member 69 in engagement with the inner and outer races of the bearings to provide an outer seal therefor.

To further provide a seal for the bearings and eliminate all possibility of dirt entering same, closure members 70, of larger diameter than the bore 43 of the bearing blocks, are applied to said blocks whereby the closure members engage the outer face 71 thereof, said closure members preferably being secured to the bearing blocks by means of inwardly projecting flanges 72 having an annular boss 73 thereon adapted to engage in an annular groove 74 provided in the bores 43 of the bearing blocks adjacent the outer face 71 thereof. The cover members may also be provided with threaded openings 75 adapted to be closed by screws 76 to provide access through the bearing enclosures without removing the cover member if desired. The openings 75 also provide access for suitable tools, such as a screw driver, for engaging the slot in the head 65 of the screw 66 whereby said screw may be turned to apply pressure to the cover member 70 for removing same from the bearing blocks. Further seal for the bearings is formed by providing the inner faces 54 of the bearing blocks with projecting rings 77 adapted to engage felt, or other suitable material, of seal rings 78 suitably mounted on the enlarged portion 53 of the trunnion members.

The standard 3 is preferably provided with a vertical circle 79 having ears 80 engaging said standard and an ear 81 adapted to rest on the cylindrical portion 33 of the bearing block 26, said vertical circle being suitably secured to the standard and bearing blocks by screws 82 or the like. Suitably mounted on the enlarged portion 53 of the trunnion member 49 is a vertical limb 83 having a graduated scale 84 mounted thereon adapted to be read in cooperation with a vernier 85 mounted on said standard to indicate the degree of elevation of a telescope.

It is desirable that the telescope have free movement for fast adjustment to the approximate angle of elevation desired and then have positive control over any roll of the trunnions to provide a fine adjustment to the exact elevation without possibility of further movement after the setting has been obtained. In order to provide such control a clamping mechanism 85 is applied to the trunnion member 50. This mechanism consists of a collar 86, substantially the width of the spacing between the outer face of the flange 62 and the inner face 54 of the bearing block 27, said collar having a bore 87 which is a close running fit on the enlarged portion 53 of the trunnion member 50, and a counterbore 88 preferably opening into the collar from side adjacent the bearing block 27. The bore 87 cooperates with a flange 62 on the boss 58 to substantially close one end of said bore. The counterbore 88 preferably contains the seal member 77 for the bearing block 27, said seal member 77 being spaced from the flange 62 substantially the same distance as the width of the enlarged portion 53 of the trunnion member 50.

Extending laterally of the collar 86 is a boss 90 having a threaded bore 91 therein for receiving a clamp screw 92 having a tapered end 93 adapted to engage a follower 94 slidable in a counterbore 95 at the inner end of the threaded bore 91. The follower has an arcuate face 96 adapted to engage the enlarged portion 53 of the trunnion 50. Threading the screw 92 into the boss 90 will apply pressure to the follower 94 forcing the face 96 thereof into clamping engagement with the trunnion 50 to substantially clamp and lock the collar 86 to the trunnion member. The collar 86 is provided with an outwardly projecting arm 97 having engagement with an ear 98 on the standard 4 through a slow motion assembly 99 for providing a fine adjustment to the position of the telescope. Backing off the screw 92 will release the follower 94 from engagement with the trunnion 50 and permit complete freedom of movement of the trunnions and telescope relative to the arm 96 and slow motion assembly.

It is necessary that the bearing on one standard may be adjusted in a vertical direction to render the axis of the trunnion perpendicular to the vertical axis of the instrument. To provide for such adjustment bearing supporting heads 23 and 24 are provided with threaded apertures 100 and 101 for receiving the threaded shank 102 of a screw 103, said shank 102 being adapted to extend through a threaded bore and into the opening in the bearing supporting head. Since only one of the bearings need to be adjusted, the screw is illustrated in the bore 101 of the standard 24 and is provided with a lock nut 104 for retaining the screw in adjusted position. In order to adjust the bearing the screws 40 are loosened and the screw 103 rotated to adjust the axis of the trunnions. When proper adjustment is obtained the screws 40 are tightened and the lock nut 104 tightened to rigidly retain the bearing blocks in the adjusted position and prevent any further movement of same.

In using an instrument constructed as described, the surveying instrument is mounted on a standard type of tripod (not shown) and secured thereto by the foot plate 11, the horizontal and vertical limb set at zero relative to the respective verniers, and the leveling screws 12 adjusted to level the instrument. If the trunnion axis is not perpendicular to the vertical axis of the instrument, the screws 40 and lock nuts 104 are loosened and the screw 103 rotated to move the bearing block 27 upwardly or downwardly to properly position the trunnion axis. The screws 40 and lock nut 104 are then tightened to rigidly hold the bearing block 27 in the adjusted position and since the screws 40 for the bearing block 26 securely retain the bearing block 26 in the opening 25 of the standard 3, there can be no shifting or other movement of the bearing blocks, the bearings 46 are completely enclosed and lubricated and are snugly fitted on the spindles 48 and in the bores 45 eliminating any possibility of looseness or false motion of said trunnions. The screw 92 is then backed off to release follower 94 from engagement with the trunnion 50 to permit free movement of the telescope 2 and the trunnions 49 and 50 in the bearings 46. The telescope is then moved to approximately the desired elevation and screw 92 threaded into the boss 99 to engage the follower 94 to apply pressure thereto, forcing same into engagement with the trunnion 50 to securely lock the collar 86 of the arm 97 to the trunnion 50. The slow motion assembly 99 is then operated to obtain a fine adjustment of the position of the telescope, said slow motion assembly anchoring the arm 97 which is locked to the trunnion 50 through the follower 94, preventing false motion of the telescope 2, thereby assuring highly precision measurements by use of the instrument.

The structure of the instrument provides secure mounting of the bearing blocks, completely enclosed, dust-proof, lubricated, antifriction bearings, providing maximum of freedom of operation without looseness, selective, absolute freedom from rocking motion at all times and insures absolute precision measurements over a long period of use without attention in a sturdy, efficient, precision instrument, capable of withstanding abuse of field use under all conditions.

What I claim and desire to secure by Letters Patent is:

1. In a surveying instrument, a support including spaced standards, bearing blocks mounted on the upper end of said standards, said bearing blocks each having a bore therein, said standards and bearing blocks having cooperating guide surfaces for restricting the blocks against lateral movement, means for securing the bearing blocks to the standard against shifting movement, means cooperating with the securing means for adjusting one of the bearing blocks vertically, antifriction bearings each including a relatively rotatable outer ring member and inner ring member having a space therebetween for accommodating rolling elements, said outer ring members being mounted in the bearing bores, means in said bores engaging the side of the outer ring members, means carrying an instrument, trunnions on said carrying means extending through the axis of the inner ring members for mounting same thereon, shoulders on the trunnions for engaging the adjacent side faces of the inner ring members, and means on the trunnions engaging the other side faces of said inner ring members for retaining same against longitudinal movement.

2. In a surveying instrument, a support including spaced standards, bearing blocks mounted on the upper end of said standards, said bearing blocks each having a bore therein and an inwardly extending bearing supporting flange, said standards and bearing blocks having cooperating guide surfaces for restricting the blocks against lateral movement, means for securing the bearing blocks to the standard against shifting movement, means cooperating with the securing means for adjusting one of the bearing blocks vertically, antifriction bearings each including a relatively rotatable outer ring member and inner ring member having a space therebetween for accommodating rolling elements, said outer ring members being mounted in the bearing bores and engaging the bearing supporting flanges therein, means carrying an instrument, trunnions on said carrying means extending through the axis of the inner ring members for mounting same thereon, shoulders on the trunnions for engaging the adjacent side faces of the inner ring members, means on the trunnions engaging the other side faces of said inner ring members for retaining same against longitudinal movement, and seal members engaging the bearing blocks to close the bores against entry of foreign matter.

3. In a surveying instrument, a support including spaced standards, bearing blocks mounted on the upper end of said standards, said bearing blocks each having a bore therein and an inwardly extending bearing supporting flange, said standards and bearing blocks having cooperating guide surfaces for restricting the blocks against lateral movement, means for securing the bearing blocks to the standard against shifting movement, means cooperating with the securing means for adjusting one of the bearing blocks vertically, antifriction bearings each including a relatively rotatable outer ring member and inner ring member having a space therebetween for accommodating rolling elements, said outer ring members being mounted in the bearing bores and engaging the bearing supporting flanges therein, means carrying an instrument, trunnions on said carrying means extending through the axis of the inner ring members for mounting same thereon, said trunnions having shoulders engaging the adjacent faces of the bearing blocks, shoulders on the trunnions for engaging the adjacent side faces of the inner ring members, and means on the trunnions engaging the other side faces of said inner ring members for retaining same against longitudinal movement.

4. In a surveying instrument, a support including spaced standards, bearing blocks mounted on the upper end of said standards, said bearing blocks each having a bore therein and an inwardly extending bearing supporting flange, said standards and bearing blocks having cooperating guide surfaces for restricting the blocks against lateral movement, means for securing the bearing blocks to the standards against shifting movement, means cooperating with the securing means for adjusting one of the bearing blocks vertically, antifriction bearings each including a relatively rotatable outer ring member and inner ring member having a space therebetween for accommodating rolling elements, said outer ring members being mounted in the bearing bores and engaging the bearing supporting flanges therein, means carrying an instrument, trunnions on said carrying means extending through the axis of the inner ring members for mounting same thereon, said trunnions having shoulders engaging the adjacent faces of the bearing blocks, shoulders on the trunnions for engaging the adjacent side faces of the inner ring members, resilient seal members in engagement with the inner and outer ring members forming a seal for the space therebetween, seal rings on the trunnions engaging adjacent faces of the bearing blocks, and cap members having flanges engaging the bores of the bearing blocks to close the outer ends thereof.

5. In a surveying instrument, a support including spaced standards, bearing blocks mounted on the upper end of said standards, said bearing blocks each having a bore therein and an inwardly extending bearing supporting flange, said standards and bearing blocks having cooperating guide surfaces for restricting the blocks against lateral movement, means for securing the bearing blocks to the standards against shifting movement, means cooperating with the securing means for adjusting one of the bearing blocks vertically, antifriction bearings each including a relatively rotatable outer ring member and inner ring member having a space therebetween for accommodating rolling elements, said outer ring members being mounted in the bearing bores and engaging the bearing supporting flanges therein, means carrying an instrument, trunnions on said carrying means extending through the axis of the inner ring members for mounting same thereon, said trunnions having shoulders engaging the adjacent faces of the bearing blocks, shou'ders on the trunnions for engaging the adjacent side faces of the inner ring members, resilient seal members in engagement with the inner and outer ring members forming a seal for the space therebetween, seal rings on the trunnions engaging adjacent faces of the bearing blocks, annular ribs on the adjacent faces of the bearing blocks engaging the seal rings on the trunnions for further sealing the openings into the bearing block bores, and cap members having flanges engaging in the bores of the bearing blocks to close the outer ends thereof.

AMBER N. BRUNSON.

REFERENCES CITED

The following references are of record in the file of this patent:

UNITED STATES PATENTS

| Number | Name | Date |
|---|---|---|
| 1,003,419 | Berger | Sept. 19, 1911 |
| 1,136,883 | Lietz | Apr. 20, 1915 |
| 1,758,667 | Hughes | May 13, 1930 |
| 1,952,525 | Arms | Mar. 27, 1934 |
| 2,320,794 | Pew | June 1, 1943 |